(12) United States Patent
Mikkelsen

(10) Patent No.: US 9,516,249 B1
(45) Date of Patent: Dec. 6, 2016

(54) PIXEL CONTROL SIGNAL DRIVER

(71) Applicant: OMNIVISION TECHNOLOGIES, INC., Santa Clara, CA (US)

(72) Inventor: Sindre Mikkelsen, Ski (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/845,030

(22) Filed: Sep. 3, 2015

(51) Int. Cl.
  *H04N 5/378* (2011.01)
  *H04N 5/225* (2006.01)
  *H04N 5/369* (2011.01)

(52) U.S. Cl.
  CPC ............ *H04N 5/378* (2013.01); *H04N 5/2253* (2013.01); *H04N 5/3698* (2013.01)

(58) Field of Classification Search
  None
  See application file for complete search history.

(56) References Cited

U.S. PATENT DOCUMENTS

| 2013/0214127 A1* | 8/2013 | Ohya | H04N 5/37455 250/208.1 |
| 2015/0009380 A1* | 1/2015 | Kobayashi | H04N 5/378 348/302 |

* cited by examiner

*Primary Examiner* — James Hannett
(74) *Attorney, Agent, or Firm* — Blakely Sokoloff Taylor & Zafman LLP

(57) ABSTRACT

A pixel control circuit includes a first supply rail coupled to provide a first supply voltage. A second supply rail is coupled to provide a second supply voltage. A variable resistance circuit is coupled to the second power supply rail. A plurality of driver circuits is coupled between the first supply rail and the variable resistance circuit. Each one of the plurality of driver circuits is coupled to provide a control signal coupled to control a pixel circuit. The variable resistance circuit is coupled to provide a first resistance between the plurality of driver circuits and the second supply rail during a sampling operation of the pixel circuit. The variable resistance circuit is coupled to provide a second resistance between the plurality of driver circuits and the second supply rail during a non-sampling operation of the pixel circuit.

20 Claims, 4 Drawing Sheets

PIXEL CONTROL SIGNAL DRIVER

BACKGROUND INFORMATION

Field of the Disclosure

The present invention relates generally to image sensors. More specifically, examples of the present invention are related to circuits that control image sensors.

Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and higher quality image sensors have encouraged the further advancement of these image sensors.

In a conventional CMOS active pixel sensor, image charge is accumulated in a photodiode in response to incident light is then transferred from a photosensitive device (e.g., a photodiode) and is converted to a voltage signal inside the pixel circuit on a floating diffusion node. The image charge on the floating diffusion may then be amplified and then read out and sampled through a bitline by readout circuitry.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
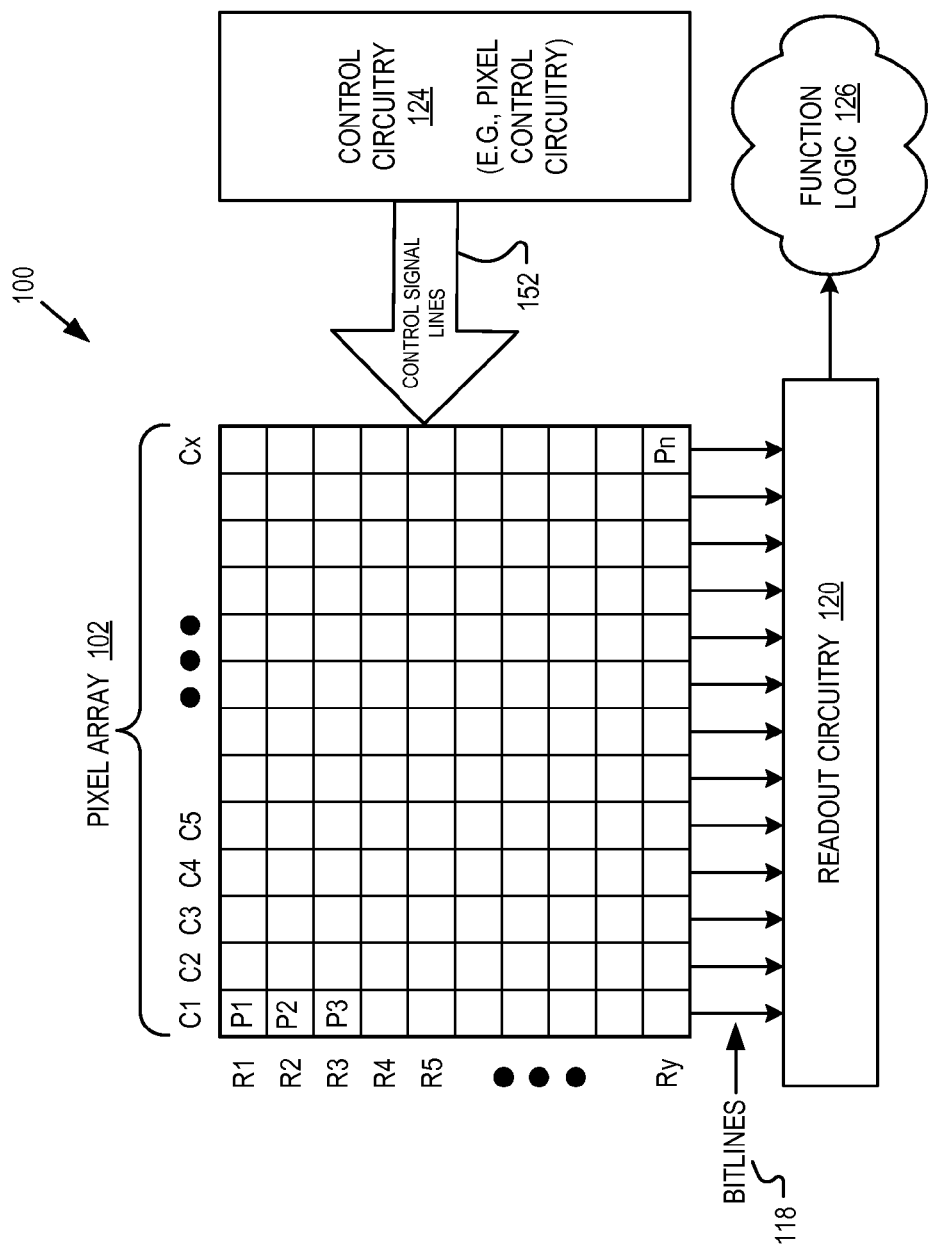
FIG. 1 is a is a block diagram illustrating an example imaging system including a control circuitry with pixel control circuitry with adaptive bandwidth to control pixel circuits in a pixel array in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe a pixel control circuit with adaptive bandwidth to control pixel circuitry in accordance with the teachings of the present invention. In various example, pixel control signals for a pixel array are driven by separate drivers in each row. Control signals that are used to control the pixel circuits are deliberately designed with a bandwidth (BW) limitation to provide uniform pixel operation across all columns of the pixel array, and to improve lag. In the various examples, the drivers are designed to have a rise and fall time that are comparable to the time constant of the control signal line routed through a row of pixels. This gives uniform rise and fall times for control signals throughout the pixel array, which is important for uniform pixel response. However, the control signal lines can often have a resistance of 1 kilohm or more. The high resistance in the control signal lines can result in noise in the control signal lines that will appear as horizontal noise in the captured images.

As will be shown, in various examples, the pixel control circuit includes a variable resistance circuit that provides an increased series resistance to the driver circuits of the pixel control circuitry to limit that bandwidth of the control signal to the bandwidth of the control signal line. By adapting the bandwidth of the pixel control circuit in this way, the drive circuits of the pixel control circuits have rise and fall times that match with and are comparable to the time constant of the control signal lines that are routed through a row of pixels across all of the columns of the pixel array. This results in uniform rise and fall times for the control signals provided to the pixel circuits throughout the pixel array, which provides uniform pixel response.

In addition, however, in various examples, the variable resistance circuit is also coupled to reduce the series resistance to the drive circuits during sampling operations of the pixel array. By reducing the series resistance to the drive circuits with the variable resistance circuit, noise is reduced in the pixel array during sampling, which provides improved image quality performance with less horizontal noise in accordance with the teachings of the present invention.

To illustrate, FIG. 1 is a is a block diagram illustrating an example imaging system 100 including control circuitry 124 having pixel control circuitry with adaptive bandwidth to control pixel circuits in a pixel array in accordance with the teachings of the present invention. As shown in the depicted example, imaging system 100 includes pixel array 102 coupled to control circuitry 124 and readout circuitry 120, which is coupled to function logic 126 as shown.

In one example, pixel array 102 is a two-dimensional (2D) array of imaging sensors or pixel circuits (e.g., pixel circuits P1, P2 . . . , Pn). In one example, each pixel circuit is a CMOS imaging pixel. As illustrated, each pixel circuit is arranged into a row (e.g., rows R1 to Ry) and a column (e.g., column C1 to Cx) to acquire image data of a person, place, object, etc., which can then be used to render a 2D image of the person, place, object, etc.

In one example, each pixel circuit in pixel array 102 includes a photodiode coupled to accumulate image charge in response to incident light. After each pixel circuit has accumulated its image data or image charge, the image data is read out by readout circuitry 120 through readout column bit lines 118, and then transferred to function logic 126. In one example, readout circuitry 120 may include circuitry, such as for example integrator circuitry, analog-to-digital conversion circuitry, sample and hold circuitry, or the like, that is coupled to each column C1 to Cx. Function logic 126 is coupled to receive the image data from readout circuitry. Function logic 126 may simply store the image data or even manipulate the image data by applying post image effects (e.g., crop, rotate, remove red eye, adjust brightness, adjust contrast, or otherwise). In one example, readout circuitry 120 may readout a row of image data at a time along readout column bitlines 118 (illustrated) or may readout the image data using a variety of other techniques (not illustrated), such as a serial readout or a full parallel readout of all pixels simultaneously.

In one example, control circuitry 124 is coupled to pixel array 102 to control operational characteristics of pixel array 102. In one example, control circuitry 124 includes pixel control circuitry that generates control signals that are coupled to control pixel array 102 through control signal lines 152. In one example, the pixel control circuitry included in control circuitry 124 has adaptive bandwidth that provides an increased series resistance to the internal driver circuits to limit that bandwidth of the control signals to the bandwidth of the control signal lines 152. By adapting the bandwidth, the drive circuits of the pixel control circuits have rise and fall times that match with and are comparable to the time constant of the control signal lines 152 that are routed through each row (R1 . . . Ry) of pixels across all of the columns (C1 . . . Cx) of the pixel array 102. This results in uniform rise and fall times for the control signals provided to the pixel circuits throughout the pixel array 102, and provides uniform pixel response. In addition, in one example, the series resistance to the drive circuits of the pixel control circuitry is reduced during sampling operations of the pixel array 102 by readout circuitry 120 to reduce noise the pixel array during sampling, which provides improved image quality performance with less horizontal noise in accordance with the teachings of the present invention.

In one example, control circuitry 124 may also generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
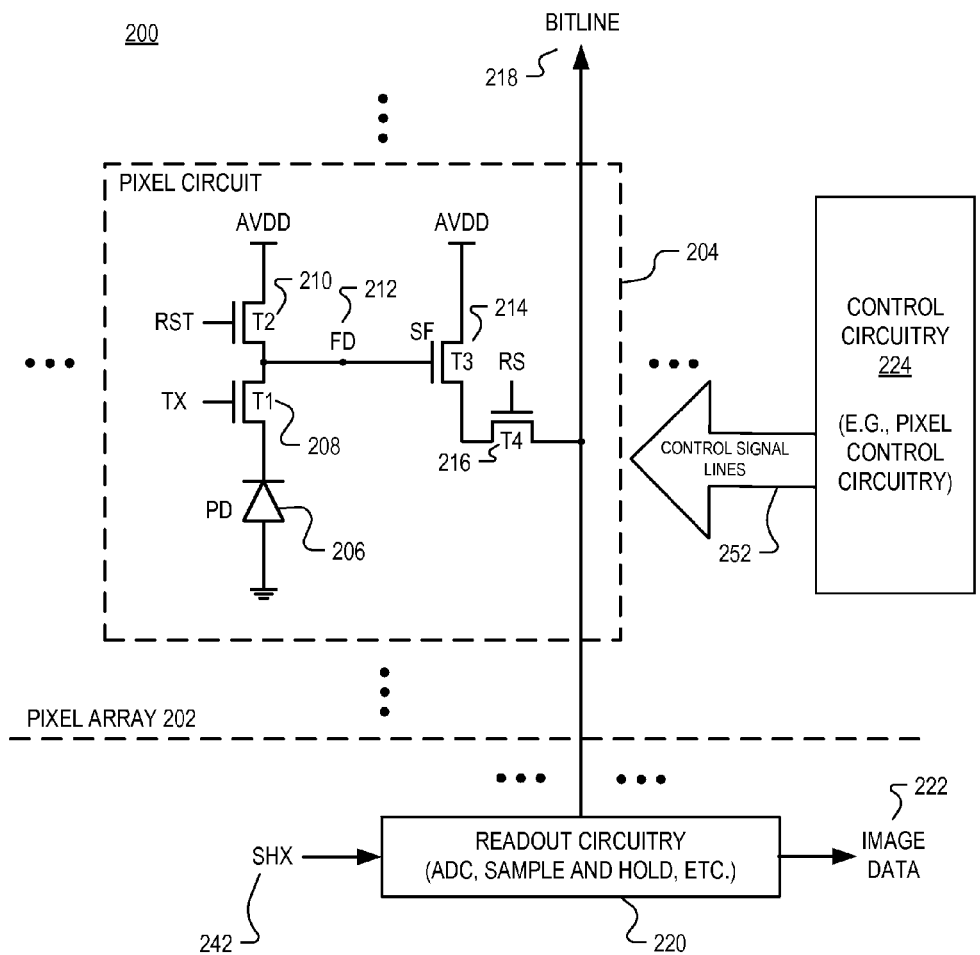
FIG. 2 is a schematic illustrating one example of an image sensor having a pixel circuits that are controlled with pixel control circuitry with adaptive bandwidth in accordance with the teachings of the present invention.

FIG. 2 is a schematic illustrating one example of an image sensor 200 having pixel circuits 204 that are controlled with pixel control circuitry with adaptive bandwidth included in control circuitry 224 in accordance with the teachings of the present invention. It is noted that the elements illustrated in FIG. 2, including pixel array 202, control circuitry 224, and readout circuitry 220 may be examples of pixel array 102, control circuitry 124, and readout circuitry 120 of FIG. 1, and that similarly named and numbered elements referenced below are coupled and function similar to as described above. As shown in the depicted example, the image sensor 200 includes a plurality of pixel circuits 204 that are arranged into rows and columns in a pixel array 202. In the depicted example, pixel circuit 204 is illustrated as being a four-transistor (4T) pixel circuit. It is appreciated that pixel circuit 204 is one possible example of pixel circuitry architecture for implementing each pixel circuit within image sensor 200. However, it should be appreciated that other examples in accordance with the teachings of the present invention are not necessarily limited to 4T pixel architectures. One having ordinary skill in the art having the benefit of the present disclosure will understand that the present teachings are also applicable to 3T designs, 5T designs, and various other pixel architectures in accordance with the teachings of the present invention.

In the example depicted in FIG. 2, pixel circuit 204 includes a photosensitive element, which may also be referred to as a photodiode (PD) 206 to accumulate image charge in response to incident light, a transfer transistor T1 208, a reset transistor T2 210, a floating diffusion (FD) node 212, an amplifier transistor, which is illustrated as a source-follower (SF) transistor T3 214, and a row select transistor T4 216. Row select transistor T4 216 is coupled to selectively output the amplified image data from amplifier transistor SF T3 214 to readout column bitline 218.

During operation, transfer transistor T1 208 receives a transfer signal TX through control signal lines 252 from pixel control circuitry included in control circuitry 224, which selectively transfers the image charge accumulated in photosensitive element PD 206 to floating diffusion FD node 212. As shown in the illustrated example, reset transistor T2 210 is coupled between a supply voltage AVDD and the floating diffusion node FD 212 to reset levels in the pixel circuit 204 (e.g., discharge or charge the floating diffusion node FD 212 and the photosensitive element PD 206 to a preset voltage) in response to a reset signal RST received through control signal lines 252 from pixel control circuitry included in control circuitry 224. The floating diffusion node FD 212 is coupled to control the gate of amplifier transistor SF T3 214.

Amplifier transistor SF T3 214 is coupled between the supply voltage AVDD and row select transistor RS T4 216. Amplifier transistor SF T3 214 operates as a source-follower amplifier providing a high impedance connection to the floating diffusion node FD 212. Row select transistor RS T4 216 selectively couples the output signal of pixel circuit 204 representative of image data to the readout column bitline 218 in response to a row select signal RS received through control signal lines 252 from pixel control circuitry included in control circuitry 224. In the illustrated example, bitline 218 is coupled to selectively provide the output signal representative of image data from a column of the plurality of pixel circuits 218 in the image sensor 200.

The example depicted in FIG. 2 also illustrates readout circuitry 220 is coupled to bitline 218 to receive an output signal representative of image data from pixel circuit 204. In one example, bitline 218 may also be read by readout circuitry 220 to sample a reset signal value to perform correlated double sampling. In one example, bitline 218 is coupled to all of the rows along a column of pixel array. In one example, readout circuitry 220 may include integration circuitry, analog-to-digital conversion circuitry (ADC), sample and hold circuitry, and/or the like, to read the output signal representative of image data from pixel array 202. In one example, readout circuitry 220 then outputs image data 222 in response to the output signals from pixel array 202, which may be received and processed by for example function logic, such as for example function logic 126 of FIG. 1.

In the illustrated example, readout circuitry 220 is coupled to sample and hold the output signal from pixel array 202 in response to a sample and hold signal (SHX) 242. As mentioned, in one example, image sensor 200 may also utilize sample and hold signal SHX 242 to perform correlated double sampling, and therefore sample and hold reset signal values as well as output signal values from pixel array 202. In such an example, the output value from the pixel circuit 204 may determined by taking the difference between the sampled output level value of the output signal after the image charge is transferred to the floating diffusion node FD 212, and the sampled output level of the output signal after a reset.

In one example, the pixel control circuitry included in control circuitry 224 has adaptive bandwidth that provides an increased series resistance to the internal driver circuits to limit that bandwidth of the control signals (e.g., TX, RS, etc.) to the bandwidth of the control signal lines 252. By adapting the bandwidth, the drive circuits of the pixel control circuits included in control circuitry 224 have rise and fall times that match with and are comparable to the time constant of the control signal lines 252 that are routed through each row of pixel circuits 204 across all of the columns of the pixel array 202. This results in uniform rise and fall times for the control signals (e.g., TX, RS, etc.) provided to the pixel circuits 204, and provides uniform pixel response. In addition, in one example, the series resistance to the drive circuits of the pixel control circuitry included in control circuitry 224 is reduced during sampling operations of the pixel array 202 (e.g., when the sample and hold signal SHX 242 is activated) to reduce noise the pixel array 202 during sampling, which provides improved image quality performance with less horizontal noise in accordance with the teachings of the present invention.

Figure 3:
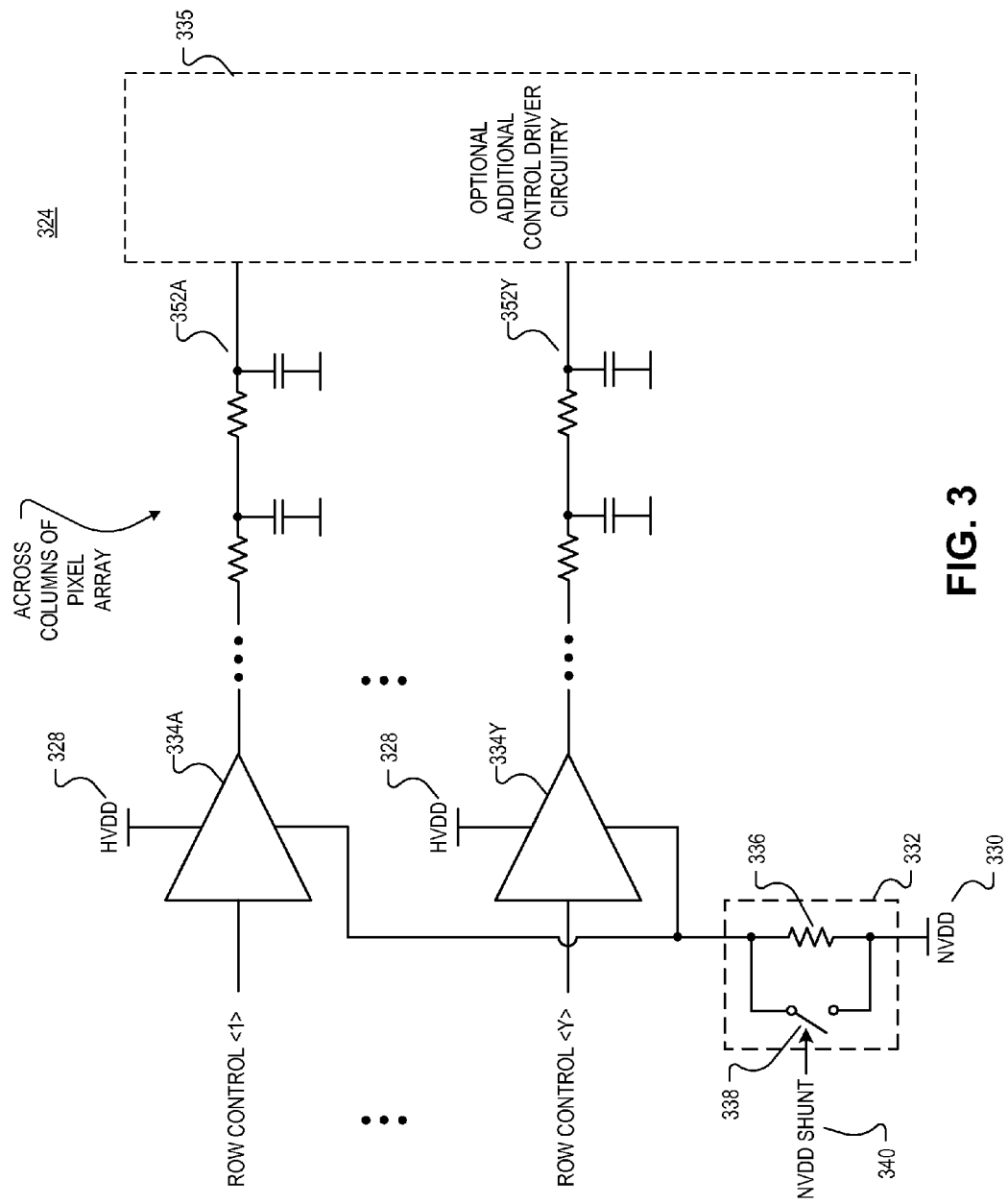
FIG. 3 is a schematic illustrating one example of pixel control circuit with adaptive bandwidth to control the pixel circuits across the columns of a pixel array in accordance with the teachings of the present invention.

FIG. 3 is a schematic illustrating one example of pixel control circuit 324 with adaptive bandwidth to control the pixel circuits in a row across the columns of a pixel array in accordance with the teachings of the present invention. It is noted that pixel control circuit 324 illustrated in FIG. 3 may be an example of the pixel control circuitry included in control circuitry 124 of FIG. 1, or control circuitry 224 of FIG. 2, and that similarly named and numbered elements referenced below are coupled and function similar to as described above.

As shown in the example depicted in FIG. 3, pixel control circuit 324 includes a first supply rail 328 coupled to provide a first supply voltage HVDD, and a second supply rail 330 coupled to provide a second supply voltage NVDD. In one example, first supply voltage HVDD is a positive voltage, and second supply voltage NVDD is a negative voltage, such that NVDD is less than HVDD. In the illustrated example, a variable resistance circuit 332 is coupled to the second power supply rail 330, and a plurality of driver circuits 334A-334Y are coupled between the first supply rail 328 and the variable resistance circuit 332 as shown.

In one example, each one of the plurality of driver circuits 334A-334Y is coupled to provide a control signal coupled to control pixel circuits. For instance, in one example, each one of the plurality of driver circuits 334A-334Y may provide a control signal such as the TX, RS, etc., which are coupled to control operation of pixel circuits in a pixel array, such as for example pixel array 102 of FIG. 1, or pixel array 202 of FIG. 2. In one example, each one of the plurality of driver circuits 334A-334Y is coupled to provide a respective control signal through a respective control signal line 352A-352Y routed through an entire row of pixel circuits in a pixel array, as shown in FIG. 3.

It is noted that there is distributed resistance/capacitance along the control signal lines 352A-352Y, which are represented in FIG. 3 with the parasitic RC circuits distributed along the control signal line. As such, the pixel control signals generated by the plurality of driver circuits 334A-334Y are deliberately designed with a bandwidth limitation to provide uniform pixel operation across all columns, and to improve lag. In one example, the bandwidth limitation is provided with an increased series resistance provided by variable resistance circuit 332 in accordance with the teachings of the present invention. With the increased series resistance, the rise and fall times of the control signals are comparable to the time constant of the control signal lines 352A-352Y, and therefore provide uniform rise/fall times for control signals in all parts of the pixel array, which provides a uniform pixel response in accordance with the teachings of the present invention.

However, as a consequence of the increased series resistance, a fundamental limit is imposed due to the noise on the far end of each control signal line, which appears as horizontal noise in the images that are sampled from the pixel array. The total resistance in the control circuitry is given by both the control driver and the control line. In another example, an additional control driver may be added on the opposite end of each control signal line on the other side of the array, which is illustrated as optional additional control driver circuitry 335 in FIG. 3. The addition of the optional control driver circuitry 335 would result in the resistance from the control drivers to be reduced by a half. Indeed, in still other examples, it is possible to add even more control drivers to each line in order to reduce the resistance from the control drivers further. With less total resistance in the control circuitry, the noise is spread out in a wider frequency band, which gives less noise in the sampled frequency band. As a result, the horizontal noise in the images could be reduced.

In order to spread out the noise in a wider frequency band, and therefore reduce the noise in the sampled frequency band, as well as provide uniform rise/fall times for all control signals, the variable resistance circuit 332 is coupled to provide a first resistance between the plurality of driver circuits 334A-334Y and the second supply rail 330 during a sampling operation of the pixel circuit to reduce noise, and provide a second resistance between the plurality of driver circuits 334A-334Y and the second supply rail 330 during a non-sampling operation of the pixel circuit to provide the uniform rise/fall times in accordance with the teachings of the present invention. In one example, the first resistance is less than the second resistance.

There are many ways to implement the tunable bandwidth signal drivers, such as with a resistor/shunt device or with a configurable driver with configurable number of driver transistors. To illustrate, the variable resistance circuit 332 illustrated in FIG. 3 shows one example, which includes a resistor 336 coupled between the plurality of driver circuits 334A-334Y and the second supply rail 330. In addition, a shunt switch 338 is coupled across the resistor 336, such that when shunt switch 338 is ON, or closed, the first resistance is provided by variable resistance circuit 332, and when shunt switch 338 is OFF, or opened, the second resistance provided by variable resistance circuit 332. Thus, in the depicted example, the first resistance is effectively zero due to the short circuit through closed shunt switch 338, and the second resistance is equal to the resistance of resistor 336. In one example, the shunt switch 338 is coupled to be switched ON and OFF in response to an NVDD SHUNT control signal 340. In one example, NVDD SHUNT control signal 340 is coupled to switch ON shunt switch 338 during a sampling operation of the pixel circuit, and NVDD SHUNT control signal 340 is coupled to switch OFF shunt switch 338 during the non-sampling operation of the pixel circuit.

It is appreciated that by providing the uniform rise/fall times in the control signals by turning OFF shunt switch 338, the bandwidth of the control signal (e.g., TX, RS, etc.) provided by each one of the plurality of driver circuits 334A-334Y is therefore limited to a bandwidth of the control signal lines 352A-352Y across all columns of the pixel array in response to the variable resistance circuit providing the second resistance (i.e., shunt switch 338 turned OFF) in accordance with the teachings of the present invention.

Figure 4:
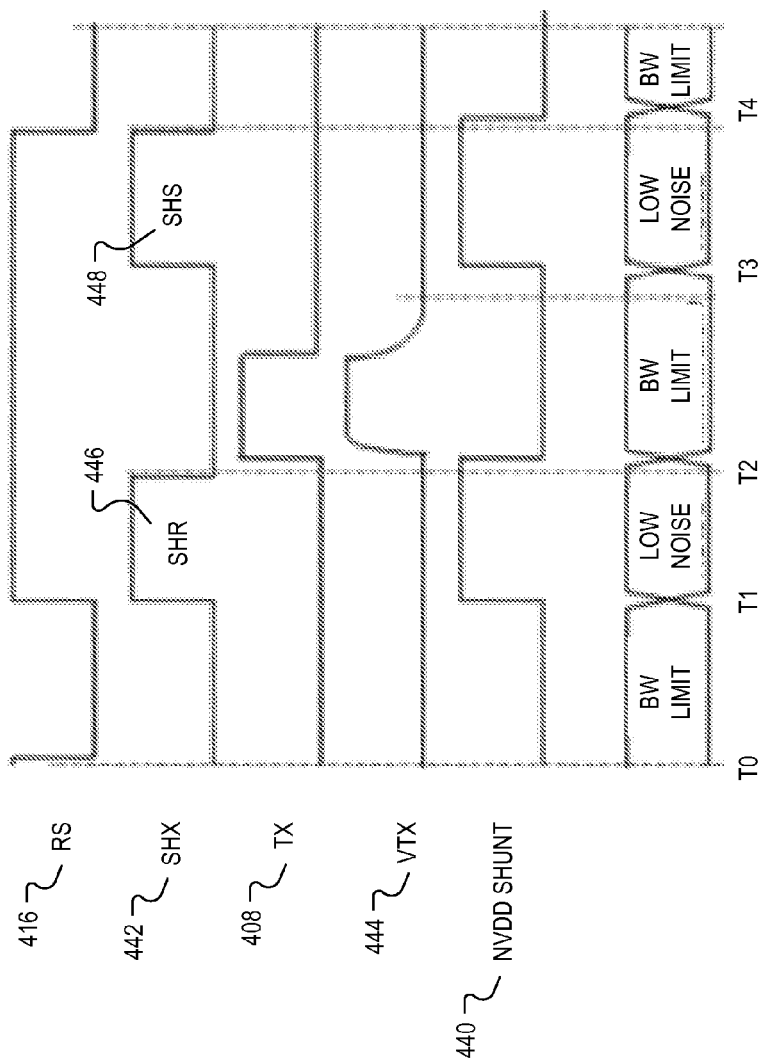
FIG. 4 illustrates a timing diagram of signals an example pixel control circuit with adaptive bandwidth to control the pixel circuits across the columns of a pixel array in an example in accordance with the teachings of the present invention.

To illustrate, FIG. 4 shows a timing diagram 450 of signals found in an imaging system including an example pixel control circuit with adaptive bandwidth to control the pixel circuits across the columns of a pixel array in an example in accordance with the teachings of the present invention. It is appreciated that the signals illustrated in FIG. 4 may be examples of the signals described above in the examples described in FIGS. 1-3, and that similarly named and numbered elements or signals referenced below are coupled and function similar to as described above.

In particular, timing diagram 450 illustrates that at time T0, a row select signal RS 416 and sample and hold signal SHX 442 are low, which indicate that the row of the particular pixel circuit has not yet been selected for sampling. During this time, the pixel circuit may for example have been reset. As such, the NVDD SHUNT signal 440 is low, which results in variable resistance circuit 332 providing the second resistance, or the higher resistance, to the pixel control circuit 324. Accordingly the pixel control signals that are output by the pixel control circuit 324 are bandwidth limited (i.e., BW LIMIT) to the bandwidth of the control signal lines 352A-352Y, and therefore have rise and fall times that are uniform throughout all parts of the pixel array, which provides uniform pixel response in accordance with the teachings of the present invention.

At time T1, row select signal RS 416, sample and hold signal SHX 442, and NVDD SHUNT signal 440 are activated. As such, the respective row of the pixel circuit has been selected, and sampling of the pixel circuit is enabled. Since sampling is enabled, the NVDD SHUNT signal 440 is activated, which reduces the series resistance provided to the plurality of drive circuits 334A-334Y, and therefore reduces noise (i.e., LOW NOISE) during sampling. In the illustrated example, a sample and hold operation of a reset signal is performed, which is indicated with SHR 446.

Once the sample and hold of the reset signal SHR 446 operation is complete, the NVDD SHUNT signal 440 is deactivated, which results in variable resistance circuit 332 providing the second resistance, or the higher resistance, to the pixel control circuit 324 to provide the uniform rise/fall times in the control signal lines 352A-352Y. Accordingly, the TX 408 control signal is activated with the uniform rise/fall times, which turns on the transfer transistor T1 TX 208 in FIG. 2 to transfer the image charge accumulated in photodiode 206 to the floating diffusion FD 212. Signal VTX 444 in FIG. 4 provides an example illustration of the actual example voltage that is applied to the transfer transistor T1 TX 208, and illustrates the example of uniform rise and fall times of the TX control signal voltage in the respective control signal line.

At time T3, once the accumulated image charge has been transferred to the floating diffusion FD 212, sample and hold signal SHX 442, and NVDD SHUNT signal 440 are activated again. As such, sampling of the pixel circuit is again enabled. Since sampling is enabled, the NVDD SHUNT signal 440 is also activated, which reduces the series resistance provided to the plurality of drive circuits 334A-334Y, and therefore reduces noise (i.e., LOW NOISE) during sampling. In the illustrated example, a sample and hold operation of the output signal of the pixel circuit is performed, which is indicated with SHS 448. In one example, the correlated double sampling value of the image data may be derived in response to the difference between the SHS 448 and SHR 446 samples.

At time T4, after the sample and hold of the output signal SHS 44i8 operation is complete, the row select RS 416 and NVDD SHUNT 440 signals are deactivated, which result in variable resistance circuit 332 providing the second resistance, or higher resistance to the pixel control circuit 324 to provide the uniform rise/fall times in the control signal lines 352A-352Y in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pixel control circuit, comprising:
a first supply rail coupled to provide a first supply voltage;
a second supply rail coupled to provide a second supply voltage;
a variable resistance circuit coupled to the second power supply rail; and
a plurality of driver circuits coupled between the first supply rail and the variable resistance circuit, wherein each one of the plurality of driver circuits is coupled to provide a control signal coupled to control a pixel circuit, wherein the variable resistance circuit is coupled to provide a first resistance between the plurality of driver circuits and the second supply rail during a sampling operation of the pixel circuit, wherein the variable resistance circuit is coupled to provide a second resistance between the plurality of driver circuits and the second supply rail during a non-sampling operation of the pixel circuit.

2. The pixel control circuit of claim 1 wherein the first resistance is less than the second resistance.

3. The pixel control circuit of claim 1 wherein the first supply voltage is greater than the second supply voltage.

4. The pixel control circuit of claim 1 wherein the variable resistance circuit comprises:
a resistor coupled between the plurality of driver circuits and the second supply rail; and
a shunt switch coupled across the resistor.

5. The pixel control circuit of claim 4 wherein the shunt switch is coupled to be switched ON during the sampling operation of the pixel circuit, and wherein the shunt switch is coupled to be switched OFF during the non-sampling operation of the pixel circuit.

6. The pixel control circuit of claim 1 wherein a bandwidth the control signal provided by each one of the plurality of driver circuits is limited to a bandwidth of a control signal line across all columns of the pixel array in response to the variable resistance circuit providing the second resistance.

7. The pixel control circuit of claim 1 wherein the plurality of driver circuits is a first plurality of driver circuits, wherein the pixel control circuit further includes a second plurality of driver circuits, which each one of the second plurality of driver circuits is coupled to provide the control signal coupled to control the pixel circuit, wherein the first and second plurality of driver circuits are coupled to opposite ends of control lines of a pixel array.

8. An imaging system, comprising:
a pixel array of a plurality of pixel circuits, wherein each one of the plurality of pixel circuits includes a plurality of transistors coupled to a photodiode to output image data in response to image charge accumulated in the photodiode in response to incident light;
readout circuitry coupled to the pixel array to sample image data from the pixel array through a plurality of bitlines, wherein each one of the plurality of bitlines is coupled to a first grouping of the plurality of pixel cells; and
control circuitry coupled to the pixel array to control operation of the pixel array, wherein the control circuit includes a plurality of pixel control circuits, wherein each one of the pixel control circuits includes:
a first supply rail coupled to provide a first supply voltage;
a second supply rail coupled to provide a second supply voltage;
a variable resistance circuit coupled to the second power supply rail;
a plurality of driver circuits coupled between the first supply rail and the variable resistance circuit, wherein each one of the plurality of driver circuits is coupled to provide a control signal coupled to control operation of a second grouping of the plurality of pixel cells, wherein the variable resistance circuit is coupled to provide a first resistance between the plurality of driver circuits and the second supply rail during a sampling operation of the pixel array by the readout circuitry, wherein the variable resistance circuit is coupled to provide a second resistance between the plurality of driver circuits and the second supply rail during a non-sampling operation of the pixel circuit.

9. The imaging system of claim 8 further comprising function logic coupled to the readout circuitry to store the image data readout from the pixel array.

10. The imaging system of claim 8 wherein the readout circuitry includes sample and hold circuitry coupled to sample the image data from the pixel array through the plurality of bitlines during the sampling operation of the pixel array by the readout circuitry.

11. The imaging system of claim 8 wherein the first grouping of the plurality of pixel circuits includes a column of the pixel array, and wherein the second grouping of the plurality of pixel circuits includes a row of the pixel array.

12. The imaging system of claim 8 wherein the first resistance is less than the second resistance.

13. The imaging system of claim 8 wherein the first supply voltage is greater than the second supply voltage.

14. The imaging system of claim 8 wherein the variable resistance circuit comprises:
a resistor coupled between the plurality of driver circuits and the second supply rail; and
a shunt switch coupled across the resistor.

15. The imaging system of claim 14 wherein the shunt switch is coupled to be switched ON during the sampling operation of the pixel circuit, and wherein the shunt switch is coupled to be switched OFF during the non-sampling operation of the pixel circuit.

16. The imaging system of claim 8 wherein a bandwidth the control signal provided by each one of the plurality of driver circuits is limited to a bandwidth of a control signal line across all columns of the pixel array in response to the variable resistance circuit providing the second resistance.

17. The imaging system of claim 8 wherein the plurality of transistors included in each one of the plurality of pixel circuits includes:
a transfer transistor coupled between the photodiode and a floating diffusion to selectively transfer the image charge accumulated in the photodiode to the floating diffusion;
an amplifier transistor coupled to the floating diffusion to output image data in response to the image charge transferred to the floating diffusion; and
a row select transistor coupled between the amplifier and a respective one of the plurality of bitlines to selectively output the image data from said one of the plurality of pixel circuits.

18. The imaging system of claim 17 wherein each one of the plurality of driver circuits includes:
a transfer control signal driver circuit coupled to generate a transfer control signal coupled to control the transfer transistor of a respective one of the plurality of pixel circuits; and
a row select control signal driver circuit coupled to generate a row select control signal coupled to control the row select transistor of the respective one of the plurality of pixel circuits.

19. The imaging system of claim 18 wherein each one of the plurality of driver circuits further includes a reset transistor coupled to selectively reset the photodiode and the floating diffusion.

20. The imaging system of claim 8 wherein the plurality of driver circuits is a first plurality of driver circuits, wherein each one of the pixel control circuits includes a second plurality of driver circuits, wherein each one of the second plurality of driver circuits is coupled to provide the control signal coupled to control operation of the second grouping of the plurality of pixel cells, wherein the first and second plurality of driver circuits are coupled to opposite ends of control lines of the pixel array.

* * * * *